(12) United States Patent
Klein et al.

(10) Patent No.: US 9,266,995 B2
(45) Date of Patent: Feb. 23, 2016

(54) BINDING AGENT MIXTURE, COATING AGENTS CONTAINING SAID BINDING AGENT MIXTURE, AND COATINGS PRODUCED FROM SAID COATING AGENTS, SAID COATINGS HAVING A HIGH SCRATCH RESISTANCE, HIGH WEATHERING STABILITY, AND GOOD OPTICAL PROPERTIES

(75) Inventors: Günter Klein, Münster (DE); Andreas Poppe, Zell am Main (DE); Sabine Holtschulte, Düsseldorf (DE); Björn Feldmann, Münster (DE); Ulrike Wenking, Steinfurt (DE); Karl-Heinz Joost, Großostheim (DE)

(73) Assignee: BASF Coatings GmbH, Munster (DE)

( * ) Notice: Subject to any disclaimer, the term of this patent is extended or adjusted under 35 U.S.C. 154(b) by 854 days.

(21) Appl. No.: 13/395,576

(22) PCT Filed: Aug. 3, 2010

(86) PCT No.: PCT/EP2010/004747
§ 371 (c)(1),
(2), (4) Date: Apr. 30, 2012

(87) PCT Pub. No.: WO2011/029502
PCT Pub. Date: Mar. 17, 2011

(65) Prior Publication Data
US 2013/0052469 A1 Feb. 28, 2013

(30) Foreign Application Priority Data
Sep. 12, 2009 (DE) .......................... 10 2009 041 380

(51) Int. Cl.
*C08L 75/06* (2006.01)
*C08G 18/42* (2006.01)
*C08G 18/16* (2006.01)
*C08G 18/28* (2006.01)
*C08G 18/71* (2006.01)
*C08G 18/77* (2006.01)
*C08G 18/80* (2006.01)
*C09D 175/04* (2006.01)
*C08G 18/18* (2006.01)

(52) U.S. Cl.
CPC .......... *C08G 18/4288* (2013.01); *C08G 18/168* (2013.01); *C08G 18/1883* (2013.01); *C08G 18/289* (2013.01); *C08G 18/718* (2013.01); *C08G 18/778* (2013.01); *C08G 18/809* (2013.01); *C09D 175/04* (2013.01); *C08G 18/18* (2013.01); *C08G 18/42* (2013.01); *Y10T 428/31663* (2015.04)

(58) Field of Classification Search
CPC .. C08G 18/1883; C08G 18/18; C08G 18/809; C08G 18/42
See application file for complete search history.

(56) References Cited

U.S. PATENT DOCUMENTS

| 4,710,542 | A | 12/1987 | Forgione et al. | |
|---|---|---|---|---|
| 5,516,559 | A | 5/1996 | Rockrath et al. | |
| 5,716,678 | A | 2/1998 | Rockrath et al. | |
| 6,403,699 | B1 | 6/2002 | Rockrath et al. | |
| 8,013,099 | B2 | 9/2011 | Poppe et al. | |
| 8,569,438 | B2 * | 10/2013 | Groenewolt et al. | ........... 528/21 |
| 2003/0027921 | A1 | 2/2003 | Speier et al. | |
| 2010/0143596 | A1 | 6/2010 | Groenewolt et al. | |
| 2011/0059251 | A1 | 3/2011 | Poppe et al. | |
| 2011/0245406 | A1 | 10/2011 | Klein et al. | |
| 2011/0263789 | A1 | 10/2011 | Taniguchi et al. | |

FOREIGN PATENT DOCUMENTS

| DE | 102005045228 A1 | 4/2007 | |
|---|---|---|---|
| DE | 102007026722 A1 | 12/2008 | |
| DE | 102007061855 A1 | 6/2009 | |
| DE | 102008060454 A1 | 6/2010 | |
| EP | 0008127 A1 | 2/1980 | |
| EP | 0249201 A2 | 12/1987 | |
| EP | 0276501 A2 | 8/1988 | |
| EP | 0245700 B1 | 8/1994 | |
| EP | 0626888 B1 | 5/1997 | |
| EP | 994117 A1 * | 4/2000 | ................ C07F 7/18 |

(Continued)

OTHER PUBLICATIONS

International Search Report for International Application No. PCT/EP2010/004747, mailed Feb. 9, 2011, 4 pages.

(Continued)

*Primary Examiner* — Michael Pepitone
(74) *Attorney, Agent, or Firm* — Servilla Whitney LLC

(57) ABSTRACT

Binder mixture comprising a hydroxyl-containing compound (A), and at least 1.0% by weight, based on the nonvolatile constituents of the binder mixture, of a phosphorus- and nitrogen-containing catalyst (D) for the crosslinking of silane groups, wherein the hydroxyl-containing compound (A) comprises a hydroxyl-functional polyester having on average at least one hydroxyl function of the polyester esterified with a C8 to C9 monocarboxylic acid, and the catalyst (D) is blocked with at least one tertiary amine of the formula (I)

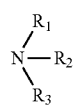

(I)

where $R_1$ is an acyclic aliphatic or araliphatic hydrocarbon radical having at least 3 C atoms, $R_2$ is an acyclic aliphatic or araliphatic hydrocarbon radical which is the same or different from $R_1$ and/or $R_3$, and $R_3$ is hydrogen or an acyclic aliphatic or araliphatic hydrocarbon radical which is the same or different from $R_1$ and/or $R_2$.

6 Claims, No Drawings

(56) References Cited

FOREIGN PATENT DOCUMENTS

| | | |
|---|---|---|
| EP | 0692007 B1 | 12/2001 |
| EP | 1273640 A2 | 1/2003 |
| EP | 0991690 B1 | 8/2004 |
| WO | WO9422968 A1 | 10/1994 |
| WO | WO9712945 A1 | 4/1997 |
| WO | WO2008074489 A1 | 6/2008 |
| WO | WO2010063332 A1 | 6/2010 |

OTHER PUBLICATIONS

Written Opinion of the International Searching Authority for International Application No. PCT/EP2010/004747, 6 pages.

H.G. Elias, "Makromoleküle Grundlagen Struktur—Synthese—Eigenschaften", p. 51, vol. 1, Hüthig & Wepf Verlag, Basel, Switzerland.

David R. Lide, CRC Handbook of Chemistry and Physics, 1992-1993, p. 5-112, 73rd Edition, CRC Press, Boca Raton, FL.

Römpp Lexikon "Lacke und Druckfarben" Georg Thieme Verlag, Stuttgart, 1998, pp. 250 to 252.

B. Singh et al., "Carbamylmethylated Melamines, Novel Crosslinkers for the Coatings Industry", in Advanced Organic Coatings Science and Technology Series, 1991, pp. 193 to 207, vol. 13.

Machine translation of H.G. Elias, "Makromoleküle Grundlagen Struktur—Synthese—Eigenschaften", p. 51, vol. 1, Hüthig & Wepf Verlag, Basel, Switzerland.

Machine translation of Römpp Lexikon "Lacke und Druckfarben" Georg Thieme Verlag, Stuttgart, 1998, pp. 250 to 252.

* cited by examiner

BINDING AGENT MIXTURE, COATING AGENTS CONTAINING SAID BINDING AGENT MIXTURE, AND COATINGS PRODUCED FROM SAID COATING AGENTS, SAID COATINGS HAVING A HIGH SCRATCH RESISTANCE, HIGH WEATHERING STABILITY, AND GOOD OPTICAL PROPERTIES

CROSS REFERENCE TO RELATED APPLICATIONS

This application is a National Phase Application of Patent Application PCT/EP2010/004747 filed on 3 Aug. 2010, which claims priority to DE 10 2009 041 380.4, filed 12 Sep. 2009, both of which are hereby incorporated by reference in their entirety.

FIELD OF THE INVENTION

The present invention provides binder mixtures comprising at least one hydroxyl-containing compound (A) and at least 1.0% by weight, based on the nonvolatile constituents of the mixture, of at least one phosphorus- and nitrogen-containing catalyst (D) for the crosslinking of silane groups.

The invention also relates to coating compositions based on the binder mixture and also multistage coating methods using these coating compositions, and also the use of the coating compositions as clearcoat material and application of the coating method for automotive OEM finishing and automotive refinish.

BACKGROUND OF THE INVENTION

EP-A-1 273 640 describes coating compositions comprising a polyol component and a crosslinker component consisting of aliphatic and/or cycloaliphatic polyisocyanates, 0.1 to 95 mol % of the free isocyanate groups originally present having undergone reaction with bisalkoxy-silylamine. As catalyst these coating compositions comprise customary catalysts, such as organotin compounds, dibutyltin dilaurate for example, amines or sulfonic acid-based catalysts, p-toluenesulfonic acid, for example. The coating compositions described in EP-A-1 273 640 can be used for OEM finishing and exhibit good scratch resistance in conjunction with good stability toward environmental influences. However, these coating compositions have a particularly strong tendency toward post-crosslinking, since conversion on thermal curing after application is inadequate. This has adverse effects especially for the weathering stability.

WO2008/074489 discloses coating compositions which comprise at least one hydroxyl-containing compound (A) and at least one isocyanato-containing compound (B), with one or more constituents of the coating composition containing hydrolyzable silane groups. It is essential to the invention that the coating compositions described therein comprise as catalyst (D), for the crosslinking of the silane groups, phosphorus-containing catalysts, more particularly amine-blocked partial ethylhexyl esters of phosphoric acid. Examples of amines with which the phosphoric esters are blocked are tertiary amines, preferably triethylamine. The coating compositions described therein lead to coatings having a high scratch resistance in conjunction with good weathering stability. The coating compositions are to be improved still further, however, in respect of their optical properties, more particularly in respect of their appearance. Moreover, the electrical resistance of these coating compositions is inadequate.

Especially if the coating materials are electrostatically charged in the course of their application, the electrical resistance of the coating materials is of particular importance. Depending on the plant, it may be necessary on safety grounds for the coating materials, and also, in the case of 2-component coating compositions, the individual coating components, not to have less than a particular electrical resistance value. Against this background there is interest in providing coating materials which do not fall below a certain minimum level in respect of electrical resistance. In the field of automotive OEM finishing, therefore, the usual requirement is for the coating compositions or, in the case of 2-component coating compositions, the individual coating components to have an electrical resistance of at least 200 kohm, preferably at least 250 kohm, and more preferably at least 350 kohm. The limiting values acquired are each plant-specific limiting values and may vary according to the specific mandates of the plant manufacturers. The highest limiting values in each case are particularly preferred on account of the fact that they meet the mandates of a variety of plants.

The electrical resistance is investigated with the aid of a dip probe measuring cell, with a conductivity meter of type LC 2 from Byk Gardner, in accordance with DIN 55667 at 25° C.

Finally, the as yet unpublished German patent application DE 102008 060454.2-43 describes coating compositions comprising at least one hyperbranched, dendritic, hydroxyl-functional polyester (A) having an OH number ≥180 mg KOH/g as measured via DIN 53240, and also polyisocyanates (B) which comprise at least partly hydrolyzable silane groups. Used as catalyst (D) for the crosslinking of the silane groups are phosphorus-containing catalysts, more particularly amine-blocked partial ethylhexyl esters of phosphoric acid. Examples given of amines with which the phosphoric esters are blocked are tertiary amines, such as dimethyldodecylamine or triethylamine, and also bicyclic amines, such as diazabicyclononene (DBN), diazabicyclooctane (DABCO), and diazabicycloundecene (DBU), for example. Information as to how the electrical resistance of the binder mixtures and of the coating compositions can be set, however, is absent from that specification. Nor is there any description of the use of amines comprising at least one branched aliphatic hydrocarbon radical for the purpose of blocking the phosphoric esters.

It was an object of the present invention, therefore, to provide binder mixtures and coating compositions produced from them, particularly for the clearcoat in OEM finishes and automotive refinishes, that lead to coatings having a combination of high scratch resistance, good acid resistance, and good weathering stability, with at the same time a very good overall appearance.

The aim was therefore to provide coating compositions which lead to a network with a high degree of weathering stability and which at the same time ensure high acid resistance. In addition, the coating compositions are to lead to coatings which already have a high degree of scratchproofing straight after thermal curing, and in particular a high level of gloss retention after scratch exposure. Moreover, the coatings and coating systems, especially the clearcoat systems, ought to be able to be produced even in film thicknesses >40 μm without stress cracks occurring. This is a key requirement for the use of the coatings and coating systems, particularly of the clearcoat systems, in the technologically and esthetically particularly demanding field of automotive OEM finishing.

At the same time the binder mixtures and the coating compositions produced from them ought not to fall below a certain minimum level in respect of their electrical resistance. In the field of automotive OEM finishing a customary requirement is that the electrical resistance not only of the individual coating components, such as the binder mixture, but also of the coating compositions produced from them be at least 200 kohm, preferably at least 250 kohm, and more preferably at least 350 kohm.

Finally the coating compositions ought, however, also to exhibit good transparency (low haze values) and good leveling and lead to coatings having a good overall appearance.

In the light of the above objectives, binder mixtures based on aprotic solvents have been found, comprising
at least one hydroxyl-containing compound (A) and
at least 1.0% by weight, based on the nonvolatile constituents of the mixture, of at least one phosphorus- and nitrogen-containing catalyst (D) for the crosslinking of silane groups, wherein the mixture comprises
(i) as hydroxyl-containing compound (A) at least one hydroxyl-functional polyester (A) in which on average at least one hydroxyl function of the polyester is esterified with at least one acid selected from the group of the isomeric C8 to C9 monocarboxylic acids, and
(ii) as catalyst (D) at least one phosphorus-containing catalyst blocked with at least one amine of the formula (I)

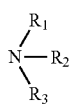
(I)

where
$R_1$ is an acyclic aliphatic or araliphatic hydrocarbon radical having at least 3 C atoms,
$R_2$ is an acyclic aliphatic or araliphatic hydrocarbon radical which is the same or different from $R_1$ and/or $R_3$, and
$R_3$ is hydrogen or an acyclic aliphatic or araliphatic hydrocarbon radical which is the same or different from $R_1$ and/or $R_2$.

The invention further provides coating compositions based on the binder mixture, and also multistage coating methods using these coating compositions, and also the use of the coating compositions as clearcoat material and application of the coating method for automotive OEM finishing and automotive refinish, and also for the coating of parts for installation in or on automobiles.

In the light of the prior art it was surprising and unforeseeable for the skilled worker that the objects on which the present invention was based could be achieved by means of the binder mixture of the invention and by means of the coating composition of the invention based on said binder mixture.

Thus it is particularly surprising that the binder mixtures of the invention and the corresponding coating compositions of the invention, in spite of the relatively high fraction of catalyst (D), have an electrical resistance of at least 200 kohm, preferably at least 250 kohm, and more preferably at least 350 kohm, as required in the automotive OEM finishing segment.

At the same time the coating compositions of the invention produce new coatings and coating systems, especially clearcoat systems, which are highly scratchproof and, in contrast to common, highly crosslinked scratchproof systems, are acid-resistant. Moreover, the coatings and coating systems of the invention, especially the clearcoat systems, can be produced even in film thicknesses >40 μm without stress cracks occurring. Consequently the coatings and coating systems of the invention, especially the clearcoat systems, can be used in the technologically and esthetically particularly demanding field of automotive OEM finishing. In that context they are distinguished by particularly high carwash resistance and scratch resistance. The high scratch resistance of the coatings exists in particular directly after their final curing, and so the coatings can be handled without problems immediately after final curing.

Furthermore it is surprising that the binder mixtures and the coating compositions at the same time also exhibit good transparency (low haze values) and good leveling and lead to coatings having a good overall appearance. Finally, the components according to the invention can be prepared with particular ease and with very good reproducibility and on application of the coating material cause no significant toxicological or environmental problems.

DETAILED DESCRIPTION OF AN EMBODIMENT OF THE INVENTION

The Binder Mixture of the Invention

The Hydroxyl-Functional Polyesters (A)

It is essential to the invention that the binder mixtures of the invention comprise at least one hydroxyl-functional polyester where on average at least one hydroxyl function of the hydroxyl-functional polyester is esterified with at least one acid selected from the group of the isomeric C8-C9 monocarboxylic acids. In particular it is possible in this way to achieve a satisfactory residual gloss in the resultant coatings. The afore-described esterification with at least one C8-C9 carboxylic acid is also referred to synonymously as "acid modification".

The radical of the isomeric C8-C9 monocarboxylic acid is preferably saturated. Clearcoat compositions of this kind exhibit good weathering stability.

Particularly advantageous properties in the sense of the invention result when the radical of the C8-C9 monocarboxylic acid is the radical of octanoic acid or isononanoic acid. With particular preference isononanoic acid is the C8-C9 monocarboxylic acid used.

Preferred for esterification with the isomeric C8-C9 monocarboxylic acids are hyperbranched, dendritic hydroxyl-functional polyesters. Hyperbranched, dendritic compounds, i.e., hyperbranched dendritic macromolecules and dendrimers, can be described generally as three-dimensional, highly branched molecules having a treelike structure. Dendrimers are highly symmetrical, whereas similar macromolecules referred to as being hyperbranched and/or dendritic may be asymmetric to a certain extent and nevertheless retain the highly branched treelike structure. Hyperbranched and dendritic macromolecules can typically be prepared starting from an initiator or nucleus having one or more reactive sites and a number of branching layers ("generations") and, if appropriate, a layer of chain-ending molecules (divergent synthesis approach). The continued replication of branching layers normally produces an increased multiplicity of branching, and if appropriate or if desired, an increased number of end groups. The layers are referred to typically as generations, and the branches as dendrons.

The polyester (A) used in accordance with the invention and modified with an isomeric C8-C9 monoarboxylic acid preferably has a hydroxyl number of ≥150 mg KOH/g, more particularly a hydroxyl number of >180 mg KOH/g, preferably 185-240 mg KOH/g, determined in accordance with DIN 53240. Use is made in particular of polyesters which have a hydroxyl functionality (given via the number of free and of esterified hydroxyl groups of the hydroxyl-functional polyester) of greater than 16. Such clearcoat compositions possess a sufficient microhardness (i.e., >90 N/mm2, determined in accordance with DIN EN ISO 14577 using the Fischerscope instrument from Fischer, with a maximum force of 25.6 mN), and are scratchproof and chemical-resistant.

Likewise preferred are hydroxyl-functional polyesters (A) which have an acid number ≤8.0, preferably 0-6.0, determined in accordance with DIN 53402. Such acid numbers of the polyesters result in better compatibility of these polyesters with other coating base materials, and in improved leveling.

Further preferred are hydroxyl-functional polyesters (A) having a number-average molecular weight of 1500-4000 g/mol, preferably 2000-3500 g/mol, determined via GPC with a polystyrene standard in THF with 0.1 mol/l acetic acid. A low molecular weight of this kind in combination with a correspondingly low molecular weight distribution on the part of the dendritic polyester leads generally to improved compatibility.

Preference is given to using polyesters with a polydispersity Mw/Mn <4. Particularly good properties result when the polyester has an even lower polydispersity, i.e., Mw/Mn <2.5, more particularly Mw/Mn ≤2.0.

It is particularly preferred to use monodisperse or substantially monodisperse polyesters, which can be prepared easily, reliably, and reproducibly, and whose properties and end structures can be easily and conveniently modified.

Polyesters of this kind can be prepared via a partial esterification of a hydroxyl-functional polyester, which is preparable in turn via a method for the synthesis of a dendritic polymeric polyalcohol (polyester polyol) having reactive and, if desired, protected hydroxyl end groups, in accordance with EP 991 690 B1, where the polymeric polyalcohol possesses n dendritic branches originating from a monomeric or polymeric initiator molecule having n reactive groups (A1), each branch comprising g branching generations, each generation comprising at least one polymeric or monomeric branching chain extender having three functional groups, of which at least two are reactive hydroxyl groups (A2) and one is a carboxyl group (A3) which is reactive with the reactive group (A1) and/or with the hydroxyl groups (A2), and, if desired, at least one spacer generation which comprises at least one spacer chain extender having two functional groups, of which one is a protected hydroxyl group (A2") and one is a group (A4) which is reactive with a hydroxyl group, with n and g being whole numbers and being at least 1, where (i) the two hydroxyl groups (A2) of the monomeric or polymeric chain branching extender used are acetal-protected hydroxyl groups (A2'), the protection by acetal being obtained through a reaction between the two hydroxyl groups (A2) and an acetal-forming carbonyl compound; and (ii) where a first branching generation is added to the initiator molecule through reaction between the reactive group (A1) and the carboxyl group (A3), in a molar ratio of the reactive groups (A1) to the carboxyl groups (A3) of at least 1, to give a polymeric polyalcohol having acetal-protected hydroxyl groups (A2') and n dendritic branches which comprise one generation, the acetal-protected hydroxyl groups (A2') being deprotected, if desired, by means of acetal cleavage, to give a polymeric polyalcohol having reactive hydroxyl groups (A2); and (iii) where further branching generations are added in g-1 repeated steps, through reaction between reactive hydroxyl groups (A2), obtained by deprotection by means of acetal cleavage, and carboxyl groups (A3), in a molar ratio of hydroxyl groups (A2) to carboxyl groups (A3) of at least 1, to give a polymeric polyalcohol having acetal-protected hydroxyl groups (A2') and n dendritic branches which comprise two or more generations, the acetal-protected hydroxyl groups (A2') being deprotected, if desired, by means of acetal cleavage, to give a polymeric polyalcohol having reactive hydroxyl groups (A2), and if desired, (iv) step (ii) and/or each repetition of step (iii) individually is followed by (a) a partial protection, such as protection as an acetal, ketal and/or ester, for example, of available reactive hydroxyl groups (A2), giving a polymeric polyalcohol having at least one reactive hydroxyl group (A2) for use in step (iii) or in a repeated step (ii), and/or (b) the addition of the optional spacer chain extender, which addition, following deprotection of the protected hydroxyl group (A2"), produces a polymeric polyalcohol having reactive hydroxyl groups (A2) for use in step (iii) or in a repeated step (iii) and n dendritic branches which comprise one or more branching generations, and at least one spacer generation is at least a sub-generation.

Besides the hydroxyl-functional polyesters (A) that are essential to the invention, the binder mixtures of the invention and the corresponding coating compositions of the invention may if desired further comprise other hydroxyl-containing compounds (C). Other hydroxyl-containing compounds (C) used may be not only low molecular weight polyols but also oligomeric and/or polymeric polyols. Particular preference is given as component (C) to non-component (A) polyester polyols, polyurethane polyols, polysiloxane polyols, and, in particular, polyacrylate polyols and/or polymethacrylate polyols, and also copolymers thereof. These optional compounds (C) are used generally in an amount of 0% to 30% by weight, based on the total weight of the coating composition.

The Catalyst (D)

It is essential to the invention that the binder mixtures of the invention and the coating compositions of the invention comprise at least one phosphorus-containing and nitrogen-containing catalyst (D). Mixtures of two or more different catalysts (D) may also be used here.

Examples of suitable catalysts (D) are amine-blocked substituted phosphonic diesters and amine-blocked diphosphonic diesters, preferably from the group consisting of amine-blocked acyclic phosphonic diesters, amine-blocked cyclic phosphonic diesters, amine-blocked acyclic diphosphonic diesters, and amine-blocked cyclic diphosphonic diesters. The corresponding nonblocked, phosphorus-containing catalysts are described in German patent application DE-A-102005045228, for example. More particularly, however, use is made of amine-blocked substituted phosphoric monoesters and phosphoric diesters, preferably from the group consisting of amine-blocked acyclic phosphoric diesters and amine-blocked cyclic phosphoric diesters. Blocking of the phosphorus-based catalysts with amines is necessary in order to be able to ensure that the resulting formulations are stable on storage. With suitability for preparing the amine-blocked catalysts (D) used in accordance with the invention, the acyclic phosphoric diesters (D) are selected more particularly from the group consisting of acyclic phosphoric diesters (D) of the general formula (II):

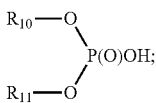

(II)

where the radicals $R_{10}$ and $R_{11}$ are selected from the group consisting of:
  substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms,
  substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein each containing the aforementioned number of carbon atoms, and
  substituted and unsubstituted radical of the aforementioned kind, containing at least one, more particularly one, heteroatom selected from the group consisting of oxygen atom, sulfur atom, nitrogen atom, phosphorus atom, and silicon atom, more particularly oxygen atom, sulfur atom, and nitrogen atom,
and being able additionally to be hydrogen as well (partial esterification).

Particular preference is given to using as catalyst (D) amine-blocked phosphoric acid alkyl esters and phosphoric acid phenyl esters, very preferably amine-blocked phosphoric acid phenyl esters.

In order to achieve the required electrical resistances of the coating composition or of the binder mixture it is essential to the invention that the catalyst (D) is blocked with one or more amines of the formula (I)

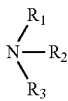

(I)

where
$R_1$ is an acyclic aliphatic or araliphatic hydrocarbon radical having at least 3 C atoms,
$R_2$ is an acyclic aliphatic or araliphatic hydrocarbon radical which is the same or different from $R_1$ and/or $R_3$, and
$R_3$ is hydrogen or an acyclic aliphatic or araliphatic hydrocarbon radical which is the same or different from $R_1$ and/or $R_2$.

Indeed, in aqueous solutions, catalysts based on phosphorus exhibit a particularly high molar conductivity, more particularly the anions when they undergo condensation to form higher phosphates (diphosphates, triphosphates, and higher analogs), as described in David R. Lide, CRC Handbook of Chemistry and Physics, 73rd Edition, 1992-1993, p. 5-112.

The inventive combination of the stated catalysts with blocking agents comprising at least one amine of the formula (I) leads surprisingly to a marked reduction in conductivity, i.e., to an increase in electrical resistance, even when the phosphorus-based catalysts (D) are used in a concentration of at least 1% by weight, based on the nonvolatile constituents of the binder mixture of the invention, as is necessary in order to achieve the mechano-technological properties of the resultant coatings.

In the formula (I) $R_1$ is an acyclic aliphatic or araliphatic hydrocarbon radical having at least 3 C atoms. $R_2$ is an acyclic aliphatic or araliphatic hydrocarbon radical which is the same or different from $R_1$ and/or $R_3$. $R_1$, $R_2$, and $R_3$ may contain not only purely aliphatic, acyclic structures but also aromatic structures. $R_3$ is hydrogen or is the same as $R_1$ or is the same as $R_2$ or is an acyclic aliphatic or araliphatic hydrocarbon radical other than $R_1$ and $R_2$. $R_3$ may likewise contain not only purely aliphatic structures but also aromatic structures.

It is preferred to use tertiary amines of the formula (I), since they have the advantage that they are unable to react with the other constituents of the coating composition, more particularly with the isocyanato-containing compounds (B).

It is preferred to use amines of the formula (I) in which at least one of the radicals $R_1$, $R_2$ and $R_3$, preferably at least 2 of the radicals $R_1$, $R_2$, and $R_3$, are aliphatic hydrocarbon radicals having 6 to 18 C atoms, more preferably having 8 to 14 C atoms.

Use is made in particular of amines of the formula (I) in which at least one of the radicals $R_1$, $R_2$, and $R_3$ is a branched aliphatic hydrocarbon radical. Particular preference is given to using amines of the formula (I) in which at least 2 of the radicals $R_1$, $R_2$, and $R_3$, and preferably all 3 radicals $R_1$, $R_2$, and $R_3$, are branched aliphatic hydrocarbon radicals. It is especially preferred to use amines of the formula (I) in which at least one, more particularly two, and very preferably all of the radicals $R_1$, $R_2$, and $R_3$ are, branched aliphatic hydrocarbon radicals having at least 3 C atoms, preferably having 6 to 18 C atoms, more preferably having 8 to 14 C atoms.

Through the use of amines of the formula (I) in which at least one of the radicals $R_1$, $R_2$, and $R_3$ is a branched aliphatic hydrocarbon radical, success is achieved in the provision of coating compositions which not only ensure the required electrical resistances but also at the same time prevent crystallization of the blocked catalyst. It will be appreciated that in accordance with the invention it is also possible to employ those amines of the formula (I) which lead to crystallization of the blocked catalyst. This observed in particular for amines (I) in which either $R_3$ is hydrogen and $R_1$ and $R_2$ are linear aliphatic hydrocarbon radicals or else all of the radicals $R_1$, $R_2$, and $R_3$ are linear aliphatic hydrocarbon radicals. In that case it is usually necessary to add crystallization inhibitors in order to prevent precipitation of the blocked catalysts. The use of or search for suitable crystallization inhibitors, however, may prove difficult.

It is also possible in accordance with the invention to block the catalyst (D) not only exclusively with one amine of the formula (I) but also to use, for the blocking of the catalysts (D) used in accordance with the invention, a mixture of 2 different amines (I) or a mixture of at least one amine of the formula (I) with at least one different amine. Thus, for example, mixtures of secondary or tertiary amines (I) with linear radicals $R_1$, $R_2$ and/or $R_3$, and secondary or tertiary amines (I) with at least one branched radical, more particularly with amines (I) in which at least one of the radicals $R_1$, $R_2$, and $R_3$ is a branched aliphatic hydrocarbon radical having 6 to 18 C atoms, preferably having 8 to 14 C atoms, can be used. The use of suitable mixtures may likewise prevent a possible crystallization. In that case the branched amine (I) thus acts as a crystallization inhibitor.

With particular preference the amine-blocked, phosphorus-containing catalyst (D) comprises or the amine-blocked, phosphorus-containing catalysts (D) comprise at least one tertiary amine of the formula (I) having a contour length of more than 8 pm as blocking agent.

The contour length is estimated by projecting the respective amine in its total extent, taking account of the respective hybridizations of the individual atoms and the consequent bond angles, into a plane. This projection is used in turn to project the maximum extent of the respective molecule onto a line. This is shown by way of example for the estimation of the contour length of pentylamine.

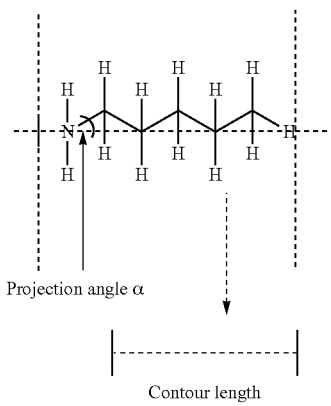

Projection angle α

Contour length

Since each of these projections is a vertical projection, the respective cosine transformations are employed for the purpose of calculation:

| Bond | Bond length [pm] | Number | Alpha | Projected length [pm] | Contribution to the contour length [pm] |
|---|---|---|---|---|---|
| C—C | 154 | 4 | 30° | 134 | 536 |
| C—H | 110 | 1 | 30° | 95.3 | 95.3 |
| N—C | 101 | 1 | 30° | 86.6 | 86.6 |

The bond lengths here are taken from the literature: see, for example, Marye A. Fox, James K. Whitesell: Organische Chemie. Spektrum Aka-demischer Verlag, 1995, ISBN 3860252496. The overall contour length is a product of the sum of the individual contributions as per the table. In this example, the contour length of pentylamine is found to be 536 pm+95 pm+87 pm=718 pm.

Corresponding estimation of the contour lengths and of the resulting hydrodynamic volumes is based on the assumption of an average bond length of 154 pm and also on a projected bond angle of 30° for the corresponding organic bonds based on an sp3 hybridization. For further details, refer to the textbook by H. G. Elias, "Makromoleküle", Hüthig & Wepf Verlag, Basel, Volume 1, "Grundlagen", page 51.

Examples of suitable amines (I) with which the phosphoric esters are blocked are linear aliphatic amines such as trioctylamine, dioctylamine, octyldimethylamine, dinonylamine, trinonylamine, nonyldimethylamine, tridodecylamine, dodecyldimethylamine, and the like. Preference is given to using branched amines, such as di(isopropanol)amine, diisoamylamine, diisobutylamine, diisononylamine, and, in particular, branched tertiary amines, examples being isododecyldimethylamine, tris(2-ethylhexyl)amine, triisoamylamine, triisononylamine, triisooctylamine, and triisopropylamine, together if desired with linear aliphatic amines.

Especially preferred in accordance with the invention for use as catalyst (D) are amine-blocked phosphoric acid phenyl esters, and more particularly phenyl phosphate blocked with tris(2-ethylhexyl)amine, dodecyldimethylamine and/or isododecyldimethylamine, very preferably with tris(2-ethylhexyl)amine.

Certain amine-blocked phosphoric acid catalysts are also available commercially (e.g., Nacure products from King Industries).

The catalysts used are preferably in fractions of at least 1.0% by weight, preferably in fractions of 2.0% to 7.0% by weight, and more preferably in fractions of 2.0% to 5.0% by weight, based on the nonvolatile constituents of the binder mixture of the invention. A relatively low catalyst efficacy can be compensated in part by means of correspondingly higher amounts employed.

In order to achieve a very balanced profile of properties it is generally worth aiming for as high as possible a concentration of the blocked catalyst. This has the advantage that the crosslinking of the silane groups is very nearly complete and hence that a high network density, and hence high scratch resistance and good chemical resistance, are achieved. Moreover, the risk of post-crosslinking events is especially low when the conversion of the silane groups that is achieved is virtually complete immediately after the end of the curing operation. The upper limit on the amount of catalyst to be used is imposed by the electrical resistance value, which may vary specifically, in accordance with the mandate of the plant manufacturer.

The binder mixtures of the invention and/or the coating compositions of the invention may also comprise a further amine catalyst based on a bicyclic amine, more particularly on an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01% to 20% by weight, more preferably in fractions of 0.1% to 10% by weight, based on the nonvolatile constituents of the binder mixture of the invention.

Further Components of the Binder Mixture

The binder mixture typically further comprises at least one organic solvent. Particularly suitable solvents for the binder mixture of the invention are those which in the binder mixture and in the coating composition are chemically inert toward the compounds (A), (B), and, where used, (C), and which also do not react with (A) and (B) when the coating composition is being cured. Examples of such solvents are aliphatic and/or aromatic hydrocarbons such as toluene, xylene, solvent naphtha, Solvesso 100 or Hydrosol® (ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent. In order to ensure good appearance, a high fraction of butyl acetate as solvent is employed in particular, more preferably at least 60% by weight of butyl acetate, based on the total weight of the solvent mixture. Further solvents are employed in order to bring about the correspondingly desired evaporation numbers.

The solids content of the binder mixture of the invention is advantageously at least 50%, preferably at least 70%, by weight.

The binder mixture of the invention, lastly, may further comprise one or more of the typical, known coatings additives (F) described below.

The Coating Compositions of the Invention

The Isocyanato-Containing Compounds (B)

The coating compositions of the invention, in addition to the above-described binder mixture of the invention, comprise at least one saturated compound (B) having isocyanate groups, which contains at least in part hydrolyzable silane groups.

The di- and/or polyisocyanates which serve as core structures for the isocyanato-containing compounds (B) used preferably in accordance with the invention are preferably conventional saturated, substituted or unsubstituted, aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodi-phenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Further-preferred polyisocyanates are the biuret dimers and the isocyanurate trimers of the aforementioned diisocyanates. Particularly preferred polyisocyanates PI are hexamethylene 1,6-diisocyanate, isophorone diisocyanate, and 4,4'-methylenedicyclohexyl diisocyanate, their biuret dimers and/or isocyanurate trimers.

In a further embodiment of the invention the polyisocyanates are polyisocyanate prepolymers with urethane structural units, which are obtained by reacting polyols with a stoichiometric excess of aforementioned polyisocyanates. Polyisocyanate prepolymers of this kind are described in U.S. Pat. No. 4,598,131, for example.

It is essential to the invention that the isocyanato-containing compound (B) contains at least in part hydrolyzable silane groups. These hydrolyzable silane groups lead to the construction of the Si—O—Si network which is distributed statistically in the finally cured coating. This means that there is no deliberate accumulation or depletion of the Si—O—Si network in particular regions of the coating.

It is preferred if the compound (B) comprises
between 2.5 and 97.5 mol %, based on the entirety of structural units (III) and (IV), of at least one structural unit of the formula (III)

—N(X—SiR"$_x$(OR')$_{3-x}$)$_n$(X'—SiR"$_y$(OR')$_{3-y}$)$_m$ (III)

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl
X, X'=linear and/or branched alkylene or cycloalkylene radical having 1 to 20 carbon atoms, preferably X, X'=alkylene radical having 1 to 4 carbon atoms
R"=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl, preferably R"=alkyl radical, in particular having 1 to 6 C atoms,
n=0 to 2, m=0 to 2, m+n=2, and x, y=0 to 2,
and
between 2.5 and 97.5 mol %, based on the entirety of structural units (III) and (IV), of at least one structural unit of the formula (IV)

—Z—(X—SiR"$_x$(OR')$_{3-x}$) (IV), where
Z=—NH—, —NR—, with
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
x=0 to 2, and
X, R', R" have the definition stated in the case of formula (III).

The respective preferred alkoxy radicals (OR') may be alike or different; critical for the structure of the radicals, however, is the extent to which they influence the reactivity of the hydrolyzable silane groups. Preferably R' is an alkyl radical, more particularly having 1 to 6 C atoms. Particular preference is given to radicals R' which increase the reactivity of the silane groups, i.e., which represent good leaving groups. With that aim in mind, a methoxy radical is preferred over an ethoxy radical, which is preferred in turn over a propoxy radical. With particular preference, therefore,
R'=ethyl and/or methyl, more particularly methyl.

Furthermore, the reactivity of organofunctional silanes may also be influenced considerably by the length of the spacers X between silane functionality and organic functional group that serves for reaction with the modifying constituent. As examples of this, mention may be made of the "alpha" silanes available from Wacker, in which a methylene group is between the Si atom and the functional group, rather than the propylene group that is present in the case of "gamma" silanes.

The isocyanato-containing compounds (B) functionalized with the structural units (III) and (IV) that are particularly preferred in accordance with the invention are obtained with particular preference by reaction of the aforementioned di- and/or polyisocyanates with a compound of the formula (IIIa)

HN(X—SiR"$_x$(OR')$_{3-x}$)$_n$(X'—SiR"$_y$(OR')$_{3-y}$)$_m$ (IIIa), and with a compound of the formula (IVa)

H—Z—(X—SiR"$_x$(OR')$_{3-x}$) (IVa), the substituents having the definition stated above.

Compounds (IIIa) preferred in accordance with the invention are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Bis(3-propyltrimethoxysilyl)amine is especially preferred. Aminosilanes of this kind are available, for example, under the brand name DYNASYLAN® from DEGUSSA or Silquest® from OSI.

Compounds (IVa) that are preferred in accordance with the invention are aminoalkyltrialkoxysilanes, such as, preferably, 2-aminoethyltrimethoxy-silane, 2-aminoethyltriethoxysilane, 3-aminopropyltrimethoxysilane, 3-aminopropyltriethoxysilane, 4-aminobutyltrimethoxysilane, 4-aminobutyltriethoxysilane. Particularly preferred compounds (IVa) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-

(triethoxysilyl)-butyl)alkylamines. N-(3-(Trimethoxysilyl) propyl)butylamine is especially preferred. Aminosilanes of this kind are available, for example, under the brand name DYNASYLAN® from DEGUSSA or Silquest® from OSI.

The isocyanato-containing compounds (B) functionalized with the structural units (III) and (IV) that are especially preferred in accordance with the invention are prepared with particular preference by reaction of the aforementioned di- and/or polyisocyanates with the aforementioned compounds (IIIa) and (IVa), with reaction of between 2.5 and 90 mol %, preferably 5 to 85 mol %, more preferably 7.5 to 80 mol %, of the isocyanate groups in the core polyisocyanate structure with at least one compound (IIIa) and between 2.5 and 90 mol %, preferably 5 to 85 mol %, more preferably 7.5 to 80 mol %, of the isocyanate groups in the core polyisocyanate structure with at least one compound (IVa).

The total fraction of the isocyanate groups reacted with the compounds (IIIa) and (IVa) in the polyisocyanate compound (B) is between 5 and 95 mol %, preferably between 10 and 90 mol %, more preferably between 15 and 85 mol % of the isocyanate groups in the core polyisocyanate structure.

Especially preferred isocyanato-containing compounds (B) are reaction products of hexamethylene 1,6-diisocyanate and/or isophorone diisocyanate, and/or isocyanurate trimers thereof, with bis(3-propyltrimethoxysilyl)amine and N-(3-(trimethoxysilyl)propyl)butylamine.

The solids content of the polyisocyanate curing agent (B) used in accordance with the invention is advantageously at least 50% by weight, preferably at least 70% by weight.

The polyisocyanate curing agent used in accordance with the invention preferably comprises at least one water scavenger, examples being reactive silanes having a higher reactivity toward water than do isocyanates. As water scavengers it is advantageous in particular to use trialkyl esters of orthoformic acid. A particularly preferred water scavenger used is triethyl orthoformate. Preference is given to adding 0.01% to 10% by weight, preferably 0.03% to 5.0% by weight, of at least one water scavenger, based on the total amount of non-volatiles in the coating composition.

The reaction of the isocyanato-containing compounds (B) with the compounds (IIIa) and (IVa) takes place preferably in an inert gas atmosphere at temperatures of not more than 100° C., preferably of not more than 60° C. The reaction of the isocyanato-containing compounds (B) with the compounds (IIIa) and (IVa) takes place preferably in a solvent or in a solvent mixture in the presence of at least one water scavenger and in the presence of at least one amine, preferably in the presence of at least one tertiary amine, such as, for example, 1,4-diazabicyclo[2.2.2]octane (DABCO), triethylamine and diisopropylethylamine, especially triethylamine.

Preferably, during the synthesis, at least 1%, preferably at least 2%, more preferably at least 3%, and very preferably at least 4% by weight of at least one water scavenger, preferably triethyl orthoformate, is added, based on the total amount of nonvolatiles in the reaction mixture.

Preferably the amine is used during the synthesis in an amount of 2% to 6% by weight, based on the total amount of nonvolatiles in the reaction mixture. Particular preference is given to using triethylamine during the synthesis in an amount of 1.5% to 3.5% by weight, based on the total amount of nonvolatiles in the reaction mixture.

The solvent or solvent mixture in which the polyisocyanate curing agents are prepared may be composed of aromatic hydrocarbons such as 1,2,4-trimethylbenzene, mesitylene, xylene, propylbenzene and isopropylbenzene. One example of a suitable solvent mixture comprising aromatic hydrocarbons is solvent naphtha. The solvent in which the polyisocyanate curing agents are prepared may also be composed of aliphatic hydrocarbons, ketones, such as acetone, methyl ethyl ketone or methyl amyl ketone, esters, such as ethyl acetate, butyl acetate, pentyl acetate or ethyl ethoxy propionate, ethers or mixtures of the aforementioned solvents, preference being given to solvent mixtures having a high butyl acetate fraction, more particularly at least 60% by weight of butyl acetate, based on the total weight of the solvent mixture. With particular preference the solvent mixture contains at least 80% by weight of butyl acetate, more particularly at least 95% by weight of butyl acetate. Very particular advantage attaches to working in pure butyl acetate.

Alternatively the polyisocyanate curing agent can also be prepared preferably by reacting in a first step on average per molecule not more than one of the isocyanate groups of the polyisocyanate with the amino-functional alkoxysilane and in a second step reacting the resulting intermediate by dimerization, trimerization, urethanization, biuretization or allophanatization to form a polyisocyanate.

The free isocyanate groups of the isocyanato-containing compounds B can also be used in a blocked form. This is preferably the case when the coating compositions of the invention are used as one-component systems. For the blocking it is possible in principle to use any blocking agent which can be used for the blocking of polyisocyanates and has a sufficiently low deblocking temperature. Such blocking agents are very familiar to the skilled worker. Preference is given to using blocking agents of the kind described in EP-A-0 626 888 and EP-A-0 692 007.

The Combination of Components A, B, Optionally C, and D and Further Components of the Coating Composition The weight fraction of the hydroxyl-containing polyesters (A) to be employed, based on the weight fraction of the isocyanato-containing compounds (B), is dependent on the hydroxyl equivalent weight of the polyester and on the equivalent weight of the free isocyanate groups of the polyisocyanate.

In the coating composition of the invention there is preferably 2.5 to 97.5 mol %, based on the sum of structural units (III) and (IV), of structural units (III) and 2.5 to 97.5 mol %, based on the sum of structural units (III) and (IV), of structural units (III).

The coating compositions of the invention contain preferably between 2.5% and 97.5%, more preferably between 5% and 95%, very preferably between 10% and 90%, and in particular between 20% and 80%, by weight, based on the amount of nonvolatile substances in the coating composition, of the hydroxyl-containing polyester (A), and preferably between 2.5% and 97.5%, more preferably between 5% and 95%, very preferably between 10% and 90%, and in particular between 20% and 80%, by weight, based on the amount of nonvolatile substances in the coating composition, of the isocyanato-containing compounds (B).

Based on the sum of the functional groups critical for crosslinking in the coating composition of the invention, formed from the fractions of the hydroxyl and isocyanate groups and also the fractions of the structural elements (III) and (IV), the structural elements (III) and (IV) are present preferably in fractions of 2.5 to 97.5 mol %, more preferably between 5 and 95 mol %, and very preferably between 10 and 90 mol %.

In order to ensure further-improved resistance properties on the part of the coatings of the invention toward cracking under UV radiation and wet/dry cycling in the CAM180 test (to DIN EN ISO 11341 February 98 and DIN EN ISO 4892-2

November 00) in combination with a high scratch resistance directly following the thermal cure, a high gloss, and high gloss retention after weathering, it is additionally preferred to select the level of structural units (III) and/or (IV) to be at most such that the coating compositions of the invention contain less than 6.5% by mass of Si of the structural units (III) and/or (IV), very preferably not more than 6.0% by mass of Si of the structural units (III) and/or (IV), based in each case on the solids content of the coating compositions. The silane content in % by mass of Si is determined arithmetically from the amounts of the compounds (IIIa) and (IVa) that are used.

The weight fractions of the polyester (A), of the compound (C), if used, and of the polyisocyanate (B) are preferably selected such that the molar equivalent ratio of the unreacted isocyanate groups of the isocyanato-containing compounds (B) to the hydroxyl groups of the polyester (A) and the optionally used compound (C) is between 0.9:1.0 and 1.2:1.0, preferably between 0.95:1.0 and 1.1:1.0, more preferably between 0.98:1.0 and 1.05:1.0.

Where the compositions are one-component coating compositions, a selection is made of the isocyanato-containing compounds (B) whose free isocyanate groups have been blocked with the blocking agents described above.

In the case of the inventively preferred 2-component (2K) coating compositions, the binder mixture comprising the hydroxyl-containing polyester (A), optionally (C), the catalyst (D), a portion of the solvent, and also, if desired further components, described below, is mixed conventionally with a further coating component, comprising the isocyanato-containing compound (B) and, where appropriate, further of the components described below, this mixing taking place shortly before the coating composition is applied.

Solvents suitable for the coating compositions of the invention are in particular those which, in the coating composition, are chemically inert toward the compounds (A), (B), and, if used, (C) and also do not react with (A) and (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1%, more preferably not more than 0.5%, by weight, based on the solvent. In order to ensure a good appearance, use is made in particular of a high fraction of butyl acetate as solvent, more preferably at least 60% by weight of butyl acetate, based on the total weight of the solvent mixture. Further solvents are employed in order to bring about the correspondingly desired evaporation numbers.

Besides the compounds (A), (B), and (C) it is possible additionally to use further binders (E), which preferably are able to react and form network points with the hydroxyl groups of the polyester (A) and/or with the free isocyanate groups of the compound (B) and/or with the alkoxysilyl groups of the compounds (B) and/or (C).

By way of example it is possible to use amino resins and/or epoxy resins as component (E). Suitable amino resins are the typical, known amino resins, some of whose methylol and/or methoxymethyl groups may have been defunctionalized by means of carbamate or allophanate groups. Crosslinking agents of this kind are described in U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, volume 13, pages 193 to 207.

Generally speaking, such components (E) are used in fractions of up to 40%, preferably up to 30%, more preferably up to 25%, by weight, based on the nonvolatile constituents of the coating composition.

The binder mixture or coating composition of the invention may further comprise at least one typical, known coatings additive (F) in effective amounts, i.e., in amounts preferably up to 30%, more preferably up to 25%, and in particular up to 20% by weight, in each case based on the nonvolatile constituents of the coating composition.

Examples of suitable coatings additives (F) are:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)3 groups;
wetting agents such as siloxanes, fluorine compounds, carboxylic monoesters, phosphoric esters, polyacrylic acids and their copolymers, or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
flame retardants, and/or
the crystallization inhibitors and/or water scavengers already listed above.

In particular, light stabilizers based on sterically hindered amines (HALS), light stabilizers based on UV absorbers, such as benzotriazoles or oxalanilides, and also rheological assistants, may likewise unfavorably influence, i.e., lower, the electrical resistance of the coating component or coating composition comprising them, and consequently the amounts in which they are used ought not to be selected too highly. On the other hand, however, these additives are also used with preference in certain minimum amounts in order to ensure the desired mechano-technological properties of the coating compositions and coatings. The amounts employed, however, can be determined easily by the skilled worker on the basis of a few routine tests.

Preference is therefore given to binder mixtures and coating compositions which comprise at least one light stabilizer based on sterically hindered amines (HALS), particular preference being given to binder mixtures and coating compositions which comprise at least one light stabilizer based on sterically hindered amines (HALS) in a concentration of more than 0.5% by weight up to a maximum of 3.0% by weight, based in each case on the nonvolatile constituents of the coating composition.

Preference is likewise given to binder mixtures and coating compositions which comprise at least one UV absorber, particular preference being given to binder mixtures and coating compositions which comprise at least one UV absorber in a concentration of more than 0.5% by weight up to a maximum of 3.0% by weight, based in each case on the nonvolatile constituents of the coating composition.

Particularly preferred binder mixtures and coating compositions comprise at least one light stabilizer based on sterically hindered amines (HALS) and at least one UV absorber.

Preference is likewise given to binder mixtures and coating compositions which comprise at least one rheological assistant, more preferably in a concentration of more than 2% by weight up to a maximum of 10% by weight, based in each case on the nonvolatile constituents of the coating composition.

In a further embodiment of the invention the binder mixture or coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surface coats, basecoat systems or typical, known clearcoat systems that have already cured, they are outstandingly suitable not only for use in automotive OEM finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are employed for automotive refinish, which are preferably between 30 and 90° C.

The coating compositions of the invention produce new cured coatings, especially coating systems, more particularly clearcoat systems; moldings, especially optical moldings; and self-supporting films, all of which are highly scratchproof and in particular are stable to chemicals and to weathering, and have a very good overall appearance. The coatings and coating systems of the invention, especially the clearcoat systems, can in particular be produced even in film thicknesses >40 μm without stress cracks occurring.

For these reasons the coating compositions of the invention are of excellent suitability as decorative, protective and/or effect-imparting, highly scratchproof coatings and coating systems on bodies of means of transport (especially motor vehicles, such as motorcycles, buses, trucks or automobiles) or parts thereof; on buildings, both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM finishing and also of automotive refinish. With particular preference the coating compositions of the invention are used in multistage coating methods, particularly in methods where a pigmented basecoat film is first applied to an uncoated or precoated substrate and thereafter a film with the coating compositions of the invention is applied. The invention, accordingly, also provides multicoat effect and/or color coating systems comprising at least one pigmented basecoat film and at least one clearcoat disposed thereon, wherein the clearcoat has been produced from the coating composition of the invention.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C.

The coats produced with the coating composition of the invention are notable in particular for an especially high chemical stability and weathering stability and also for a very good carwash resistance and scratch resistance, and at the same time exhibit very good overall appearance.

In a further preferred embodiment of the invention, the coating composition of the invention is used as a transparent clearcoat material for coating plastics substrates, especially transparent plastics substrates. In this case the coating compositions include UV absorbers, which in terms of amount and type are also designed for effective UV protection of the plastics substrate. Here as well, the coating compositions are notable for an outstanding combination of scratchproofing and weathering stability with at the same time very good appearance. The plastics substrates thus coated are used preferably as a substitute for glass components in automobile construction, the plastics substrates being composed preferably of polymethyl methacrylate or polycarbonate.

EXAMPLES

Preparation of the Inventive Polyester Polyol A1

In a reactor provided with a stirrer, reflux condenser, and water separator, 1215.4 parts by weight of isononanoic acid are introduced and 140 parts by weight of xylene are added. The mixture is heated cautiously with stirring to 80° C. Then 2284.6 parts by weight of a dendritic hydroxyl-functional polyester (Boltorn H 30, available from Perstorp) are added slowly in order to prevent lumps forming. Following the addition the reaction mixture is heated to 200° C. For monitoring the course of the reaction, the volume of condensate is recorded and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of less than 5 mg KOH/g (determined in accordance with DIN 53402) is reached. The mixture is cooled to 145° C. and dissolved in 840 parts by weight of butyl acetate.

The resulting polyester resin has a solids fraction of 78.8% by weight. The resulting hydroxyl number is 190 mg KOH/g (determined in accordance with DIN 53240), the acid number 5.8 mg KOH/g (DIN 53402).

Preparation of the Inventively Blocked, Phosphorus-Based Catalyst (D1) (Blocking Agent Tris(2-Ethylhexyl)Amine)

A 1000 ml glass flask is charged with 226.34 g of butyl acetate and 94.65 g of phenyl phosphate (75% strength, in butanol, available from Isle Chem). The mixture is stirred at room temperature and homogenized. Subsequently 179.02 g of tris(2-ethylhexyl)amine (available from BASF SE) are added slowly dropwise at a rate such that 60° C. are not exceeded. After the end of the addition, the product is stirred at 40° C. for a further 3 h.

Preparation of the Inventively Blocked, Phosphorus-Based Catalyst (D2) (Blocking Agent Diisopropanolamine)

A 1000 ml glass flask is charged with 211.90 g of butyl acetate and 187.00 g of phenyl phosphate (75% strength, in butanol, available from Isle Chem). The mixture is stirred at room temperature and homogenized. Subsequently 148.00 g of diisopropanolamine (DIPA, BASF SE) are added slowly dropwise at a rate such that 60° C. are not exceeded. After the end of the addition, the product is stirred at 40° C. for a further 3 h.

Preparation of the Inventively Blocked, Phosphorus-Based Catalyst (D3) (Blocking Agent Dimethyldodecylamine)

A 500 ml glass flask is charged with 42.00 g of butyl acetate and 32.00 g of phenyl phosphate (75% strength, in butanol, available from Isle Chem). The mixture is stirred at room temperature and homogenized. Subsequently 26.00 g of dimethyldodecylamine (DDA, ABCR, Karlsruhe) are added slowly dropwise at a rate such that 60° C. are not exceeded. After the end of the addition, the product is stirred at 40° C. for a further 3 h.

Preparation of a Noninventively Blocked, Phosphorus-Based Catalyst (DC1) (Blocking Agent DBU)

A 500 ml glass flask is charged with 53.25 g of hexanol and 17.75 g of butyl acetate and 16.0 g of phenyl phosphate (75% strength, in butanol, available from Isle Chem). The mixture is stirred at room temperature and homogenized. Subsequently 13.0 g of Lupragen N 700 (1,8-diazabicyclo-[5.4.0] undec-7-ene (DBU, BASF SE) are added slowly dropwise at a rate such that 60° C. are not exceeded. After the end of the addition, the product is stirred at 40° C. for a further 3 h.

Preparation of a Noninventively Blocked, Phosphorus-Based Catalyst (DC2) (Blocking Agent DMEA)

A 1000 ml glass flask is charged with 195.2 g of butyl acetate and 219.1 g of phenyl phosphate (75% strength, in butanol, available from Isle Chem). The mixture is stirred at room temperature and homogenized. Subsequently 85.7 g of dimethylethanolamine (DMEA, BASF SE) are added slowly dropwise at a rate such that 60° C. are not exceeded. After the end of the addition, the product is stirred at 40° C. for a further 3 h.

Preparation of a Noninventively Blocked, Phosphorus-Based Catalyst (DC3) (Blocking Agent Morpholine)

A 1000 ml glass flask is charged with 198.6 g of butyl acetate and 205.6 g of phenyl phosphate (75% strength, in butanol, available from Isle Chem). The mixture is stirred at room temperature and homogenized. Subsequently 95.8 g of morpholine (BASF SE) are added slowly dropwise at a rate such that 60° C. are not exceeded. After the end of the addition, the product is stirred at 40° C. for a further 3 h.

The solution thus obtained was initially stable on storage. After 4 weeks, however, the material underwent crystallization and could be used again as pure substance only after brief heating to 60° C. and complete dissolution of the crystals.

Preparation of a Rheological Assistant F1 Based on Ureas

A 5 l Juvo reaction vessel with heating mantle, thermometer, stirrer, and top-mounted condenser was charged with 875.7 g of an aromatic solvent. With stirring and under an inert gas atmosphere (200 cm3/min nitrogen), the aromatic solvent was heated to 160° C. under superatmospheric pressure (max. 3.5 bar). Using a measuring pump, a mixture of 37.5 g of di-tert-butyl peroxide and 138.6 g of an aromatic solvent was added dropwise at a uniform rate over the course of 4.75 h. 0.25 h after the beginning of the addition, a measuring pump was used to add 848.4 g of styrene, 600.0 g of n-butyl acrylate, 418.2 g of hydroxyethyl acrylate, and 38.4 g of methacrylic acid at a uniform rate over the course of 4 h. After the end of the addition, the temperature was maintained for 2 h and then the product was cooled to 60° C. and filtered through a 5 µm GAF bag. The resulting resin had an acid number of 15 mg KOH/g (to DIN 53402), a solids content of 65%+/−1 (60 min, 130° C.), and a viscosity of 8.5 dPa*s according to the experimental specification of DIN ISO 2884-1 (55% in solvent naphtha).

A 1 l reactor was charged with 423.5 g of the resin solution and this initial charge was diluted with 29.4 g of butyl acetate. Thereafter 11.2 g of benzylamine were added and the mixture was stirred for 30 min. After this time, with application of high shearing forces, a mixture of 8.8 g of hexamethylene diisocyanate and 17.1 g of butyl acetate was added in such a way that a reaction temperature of 40° C. was not exceeded. The resulting mixture had a viscosity of >800 mPas (10 s-1) (Z3) (DIN ISO 2884-1) and a solids content of 59.0% (60 min, 130° C.).

Preparation of the Inventive Partly Silanized Polyisocyanate B1 (HDI with 10 mol % IVa and 90 Mol % IIIa, Degree of Conversion of the Isocyanate Groups=30 mol %)

A round-bottom flask with a reflux condenser was charged with 36.296 parts by weight of trimerized hexamethylene diisocyanate (commercial product Basonat HI 100 from BASF SE, Ludwigshafen), 36.093 parts by weight of butyl acetate, and 2.458 parts by weight of triethyl orthoformate. 1.786 parts by weight of N-(3-trimethoxysilylpropan-1-yl)-

N-n-butylamine (commercial product Dynasylan 1189 from Evonik) and 23.367 parts by weight of N,N-bis(3-trimethoxysilylpropan-1-yl)amine (commercial product Dynasylan 1124 from Evonik) were premixed and metered in slowly at room temperature, under reflux and with nitrogen blanketing, in such a way that the product temperature did not exceed 60° C. Subsequently the reaction mixture was heated to 60° C. and held until the residual NCO content had reached 4.9% (NCO determination by titration).

The electrical resistance of the silanized isocyanate B1 thus prepared was measured by means of a dip probe measuring cell with an LC 2 conductivity meter from Byk Gardner (in accordance with DIN 55667), and was found to be 1080 kohm. The result is therefore well above the required figure of 200 kohm.

Formulation of the Binder Mixtures

The binder mixtures of inventive examples 1 to 4 and also the binder mixtures of comparative examples 1 to 4 were prepared from the components indicated in table 1, by mixing.

blocking agent having a comparatively high molecular weight was used, it is not possible to achieve the limit specified in the Problem, the target figure of >200 kohm. That is accomplished only with the inventive blocking agents described. In order to achieve sufficient weathering stability on the part of the clearcoat materials and to maximize the conversion of the silane crosslinking reaction, and also to obtain good techno-mechanical properties, it is advantageous to use as much catalyst as possible.

Formulation of the Coating Compositions and Production of the Coatings

For the investigation of the mechano-technological properties, the coating compositions of examples 2 to 4 and C1 to C4, prepared using, respectively, the binder mixtures of inventive examples 2 to 4 and the binder mixtures of comparative examples C1 to C4, were investigated for their scratch resistance. For the preparation of the coating compositions, 100 parts by weight of each of the binder mixtures were mixed with the number of parts by weight of the partly silanized isocyanate B1 shown in is table 3, and the mixtures were homogenized.

TABLE 1

Composition of the binder mixtures in parts by weight

|  | Comp. ex. 1 | Comp. ex. 2 | Comp. ex. 3 | Comp. ex. 4 | Invent. ex. 1 | Invent. ex. 2 | Invent. ex. 3 | Invent. ex. 4 |
|---|---|---|---|---|---|---|---|---|
| Polyester A1 | 36.6 | 36.6 | 36.6 | 36.6 | 36.6 | 36.6 | 36.6 | 36.6 |
| Additive F1 | 21.0 | 21.0 | 21.0 | 21.0 | 21.0 | 21.0 | 21.0 | 21.0 |
| Butyl acetate | 14.7 | 14.7 | 14.7 | 14.7 | 14.7 | 14.7 | 14.7 | 14.7 |
| Butylglycol diacetate | 2.1 | 2.1 | 2.1 | 2.1 | 2.1 | 2.1 | 2.1 | 2.1 |
| Triethyl orthoformate | 2.1 | 2.1 | 2.1 | 2.1 | 2.1 | 2.1 | 2.1 | 2.1 |
| Dynoadd[1] | 0.20 | 0.20 | 0.20 | 0.20 | 0.20 | 0.20 | 0.20 | 0.20 |
| Tin.384[2] | 1.60 | 1.60 | 1.60 | 1.60 | 1.60 | 1.60 | 1.60 | 1.60 |
| Tin.152[3] | 2.75 | 2.75 | 2.75 | 2.75 | 2.75 | 2.75 | 2.75 | 2.75 |
| Cat. DC1 | 1.5 | 2 | 2.5 | 3 |  |  |  |  |
| Cat. D1 |  |  |  |  | 1.5 | 2 | 2.5 | 3 |
| DBN[4] | 0.20 | 0.20 | 0.20 | 0.20 | 0.20 | 0.20 | 0.20 | 0.20 |
| ITDA[5] | 2 | 2 | 2 | 2 | 2 | 2 | 2 | 2 |
| Total | 84.75 | 85.25 | 85.75 | 86.25 | 84.75 | 85.25 | 85.75 | 86.25 |

Key to table 1:
[1] Dynoadd F1, commercial flow control additive from DYNEA ASA
[2] Tinuvin ® 384, commercial light stabilizer based on a benzotriazole, from Ciba
[3] Tinuvin ® 152, commercial light stabilizer based on a sterically hindered amine, from Ciba
[4] 30% strength solution from DBN (diazabicyclononene) in butanol
[5] Isotridecyl alcohol The respective binder mixtures were adjusted to a flow time of 33 seconds from the DIN 4 cup by addition of butyl acetate and their electrical resistance at 25° C. was studied by means of a dip probe measuring cell with an LC 2 conductivity meter from Byk Gardner (in accordance with DIN 55667). The figures set out in table 2 are each average values from three measurements.

TABLE 2

|  | Comp. ex. 1 | Comp. ex. 2 | Comp. ex. 3 | Comp. ex. 4 | Inv. ex. 1 | Inv. ex. 2 | Inv. ex. 3 | Inv. ex. 4 |
|---|---|---|---|---|---|---|---|---|
| Electrical resistance [kΩ] | 150 | 100 | 90 | 80 | 540 | 410 | 320 | 280 |

The results show clearly that the electrical resistance is heavily dependent, on the one hand, on the amount of catalyst added. Although in comparative example 1, with DBU, a

TABLE 3

Composition of the coating compositions of comparative examples C1 to C4 and of the coating compositions of inventive examples 2 to 4, in parts by weight

|  | Comp. C1 | Comp. C2 | Comp. C3 | Comp. C4 | Inv. 2 | Inv. 3 | Inv. 4 |
|---|---|---|---|---|---|---|---|
| Binder mixture C1 | 100 |  |  |  |  |  |  |
| Binder mixture C2 |  | 100 |  |  |  |  |  |
| Binder mixture C3 |  |  | 100 |  |  |  |  |
| Binder mixture C4 |  |  |  | 100 |  |  |  |
| Binder mixture B2 |  |  |  |  | 100 |  |  |
| Binder mixture B3 |  |  |  |  |  | 100 |  |
| Binder mixture B4 |  |  |  |  |  |  | 100 |

TABLE 3-continued

Composition of the coating compositions of comparative examples C1 to C4 and of the coating compositions of inventive examples 2 to 4, in parts by weight

|  | Comp. C1 | Comp. C2 | Comp. C3 | Comp. C4 | Inv. 2 | Inv. 3 | Inv. 4 |
|---|---|---|---|---|---|---|---|
| Isocyanate curing agent B1 | 123.7 | 123.0 | 122.3 | 121.6 | 122.3 | 121.6 | 120.9 |

For the assessment of the scratch resistance of the coatings, the coating compositions were applied, shortly after homogenization, in three spray passes at 2.5 bar, pneumatically, to a commercial solid-color black waterborne basecoat material from BASF Coatings AG. Thereafter each of the resulting coatings is flushed at room temperature for 5 minutes and subsequently baked at 135° C. for 20 minutes. After that the resultant coatings were assessed for their micropenetration hardness in accordance with DIN EN ISO 14577-1 and also for their scratch resistance by means of the Crockmeter test [based on EN ISO 105-X12 with 10 double rubs and an applied force of 9N, using 9 μm polishing paper (3M 281Q Wetordry™ Production™), with subsequent determination of the residual gloss at 20° using a commercial gloss instrument, after cleaning of the panels with isohexane.0] and the AMTEC test [based on EN ISO 20566:2006, after cleaning of the panels with isohexane.0]. The results obtained are compiled in table 4.

TABLE 4

| Example | Microhardness [N/mm2] | Residual gloss, Crockmeter, after cleaning [%] | Residual gloss, AMTEC, after cleaning [%] |
|---|---|---|---|
| Comp.ex. C1 | 102.6 | 72.5 | 89.5 |
| Comp.ex. C2 | 107.4 | 79.6 | 89.5 |
| Comp.ex. C3 | 109.7 | 78.8 | 91.8 |
| Comp.ex. C4 | 106.8 | 76.9 | 89.5 |
| Example 2 | 115.4 | 88.5 | 89.8 |
| Example 3 | 119.1 | 86.2 | 91.2 |
| Example 4 | 119.2 | 88.4 | 89.9 |

The results show that the inventive formulations with the inventive binder mixtures, with electrical resistance figures of more than 200 kohm, exhibit good mechanical properties. The Crockmeter results in particular are at a better level than those of the comparative examples.

In analogy to the binder mixtures of inventive examples 2 to 4, the binder mixtures of comparative examples C5 to C8 are prepared from the components specified in table 5.

TABLE 5

Composition of the binder mixtures of comparative examples C5 to C8 in parts by weight

|  | Comp. C5 | Comp. C6 | Comp. C7 | Comp. C8 |
|---|---|---|---|---|
| Polyester A1 | 36.6 | 36.6 | 36.6 | 36.6 |
| Additive F1 | 21.0 | 21.0 | 21.0 | 21.0 |
| Butyl acetate | 14.7 | 14.7 | 14.7 | 14.7 |
| Butylglycol diacetate | 2.1 | 2.1 | 2.1 | 2.1 |
| Triethyl orthoformate | 2.1 | 2.1 | 2.1 | 2.1 |

TABLE 5-continued

Composition of the binder mixtures of comparative examples C5 to C8 in parts by weight

|  | Comp. C5 | Comp. C6 | Comp. C7 | Comp. C8 |
|---|---|---|---|---|
| Dynoadd [1] | 0.20 | 0.20 | 0.20 | 0.20 |
| Tin. 384 [2] | 1.60 | 1.60 | 1.60 | 1.60 |
| Tin. 152 [3] | 2.75 | 2.75 | 2.75 | 2.75 |
| Cat. DC2 | 1.5 | 3.0 |  |  |
| Cat. DC3 |  |  | 1.5 | 3.0 |
| DBN [4] | 0.20 | 0.20 | 0.20 | 0.20 |
| ITDA [5] | 2 | 2 | 2 | 2 |
| Total | 84.75 | 86.25 | 84.75 | 86.25 |

Key to table 5:
[1] Dynoadd F1, commercial flow control additive from DYNEA ASA
[2] Tinuvin ® 384, commercial light stabilizer based on a benzotriazole, from Ciba
[3] Tinuvin ® 152, commercial light stabilizer based on a sterically hindered amine, from Ciba
[4] 30% strength solution from DBN (diazabicyclononene) in butanol
[5] Isotridecyl alcohol Investigation of the electrical resistance of the formulations gave the following result, shown in table 6:

TABLE 6

Resistances of the binder mixtures of comparative examples C5 to C8

|  | Comp. ex. 5 | Comp. ex. 6 | Comp. ex. 7 | Comp. ex. 8 |
|---|---|---|---|---|
| Electrical resistance [kohm] | 140 | 90 | 170 | 130 |

The results show that the amines having a fairly low molecular weight are not suitable for achieving the figures for electrical resistance that were required in the Problem.

As a parameter for the use of inventively suitable blocking agents it is possible to employ the estimation of the hydrodynamic volume: $V_{hydr} \sim (r_{contour}/2)^3$. A corresponding estimation of the contour lengths and of the resultant hydrodynamic volumes is shown in table 7 below and is based on the assumption of an average bond length of 155 pm and a projected bond angle of 30°. For further details, refer to the textbook by H. G. Elias, "Makromoleküle", Hüthig & Wepf Verlag, Basel, Volume 1, "Grundlagen", page 51.

TABLE 7

| Blocking agent | Number of bonds to be projected | Contour lengths [pm] | Estimated hydrodynamic volume [pm$^3$] |
|---|---|---|---|
| Tris(ethylhexyl)amine | 7 | 9.3 | 100.5 |
| Dimethylethanolamine | 4 | 5.3 | 18.6 |
| Morpholine | 2 (1) | 5.5 | 20.8 |
| DBU | 4 (1) | 6.9 | 18.6 |

In analogy to the binder mixtures of inventive examples 2 to 4, the binder mixtures of inventive examples 5 to 10 are prepared from the components specified in table 8.

TABLE 8

Composition of the binder mixtures in parts by weight

|  | Inv. ex. 5 | Inv. ex. 6 | Inv. ex. 7 | Inv. ex. 8 | Inv. ex. 9 | Inv. ex. 10 |
|---|---|---|---|---|---|---|
| Polyester A1 | 36.6 | 36.6 | 36.6 | 36.6 | 36.6 | 36.6 |
| Additive F1 | 21.0 | 21.0 | 21.0 | 21.0 | 21.0 | 21.0 |

TABLE 8-continued

Composition of the binder mixtures in parts by weight

| | Inv. ex. 5 | Inv. ex. 6 | Inv. ex. 7 | Inv. ex. 8 | Inv. ex. 9 | Inv. ex. 10 |
|---|---|---|---|---|---|---|
| Butyl acetate | 14.7 | 14.7 | 14.7 | 14.7 | 14.7 | 14.7 |
| Butylglycol diacetate | 2.1 | 2.1 | 2.1 | 2.1 | 2.1 | 2.1 |
| Triethyl orthoformate | 2.1 | 2.1 | 2.1 | 2.1 | 2.1 | 2.1 |
| Dynoadd[1] | 0.20 | 0.20 | 0.20 | 0.20 | 0.20 | 0.20 |
| Tin.384[2] | 1.60 | 1.60 | 1.60 | 1.60 | 1.60 | 1.60 |
| Tin.152[3] | 2.75 | 2.75 | 2.75 | 2.75 | 2.75 | 2.75 |
| Cat. D2 | 1.5 | 2 | — | — | — | — |
| Cat. D3 | — | — | 1.5 | 2 | 2.5 | 3 |
| DBN[4] | 0.20 | 0.20 | 0.20 | 0.20 | 0.20 | 0.20 |
| ITDA[5] | 2 | 2 | 2 | 2 | 2 | 2 |
| Total | 84.75 | 85.25 | 84.75 | 85.25 | 85.75 | 86.25 |

Key to table 8:
[1] Dynoadd F1, commercial flow control additive from DYNEA ASA
[2] Tinuvin ® 384, commercial light stabilizer based on a benzotriazole, from Ciba
[3] Tinuvin ® 152, commercial light stabilizer based on a sterically hindered amine, from Ciba
[4] 30% strength solution from DBN (diazabicyclononene) in butanol
[5] Isotridecyl alcohol The respective binder mixtures of inventive examples 5 and 6 were adjusted to a flow time of 33 seconds from the DIN 4 cup by addition of butyl acetate and—as described for inventive example 1—their electrical resistance was studied by means of a dip probe measuring cell with an LC 2 conductivity meter from Byk Gardner (in accordance with DIN 55667). This produced the figures set out in table 9:

TABLE 9

| | Inv. ex. 5 | Inv. ex. 6 | Inv. ex. 7 | Inv. ex. 8 | Inv. ex. 9 | Inv. ex. 10 |
|---|---|---|---|---|---|---|
| Electrical resistance [kΩ] | 260 | 220 | 570 | 420 | 380 | 300 |

The binder mixtures of inventive examples 7 to 10, however, show a tendency toward crystallization of the catalyst, and so, preferably, a crystallization inhibitor is added as well. It is likewise possible to block the catalyst with a mixture of dodecyldimethylamine and isododecyldimethylamine.

What is claimed is:

1. A coating composition comprising a binder mixture and at least one saturated compound (B) with isocyanate groups, which comprises at least partly hydrolyzable silane groups, wherein the binder mixture is based on aprotic solvents and comprises a hydroxyl-containing compound (A) and at least 1.0% by weight, based on the nonvolatile constituents of the binder mixture, of a phosphorus- and nitrogen-containing catalyst (D) for the crosslinking of silane groups, wherein hydroxyl-containing compound (A) includes at least one hydroxyl-functional polyester (A) in which, on average, at least one hydroxyl function of the polyester is esterified with at least one acid selected from the group of the isomeric C8 to C9 monocarboxylic acids, and wherein catalyst (D) is a phosphorus-containing catalyst blocked with an amine of the formula (I)

(I)

wherein
R$_1$ is an acyclic aliphatic or araliphatic hydrocarbon radical having at least 3 carbon atoms,
R$_2$ is an acyclic aliphatic or araliphatic hydrocarbon radical which is the same or different from R$_1$ and/or R$_3$, and
R$_3$ is hydrogen or an acyclic aliphatic or araliphatic hydrocarbon radical which is the same or different from R$_1$ and/or R$_2$.

2. The coating composition of claim 1, wherein the at least one saturated compound (B) comprises
between 2.5 and 97.5 mol %, based on the entirety of structural units (III) and (IV), of at least one structural unit of the formula (III)

$$\text{—N(X—SiR''}_x\text{(OR')}_{3-x}\text{)}_n\text{(X'—SiR''}_y\text{(OR')}_{3-y}\text{)}_m \quad \text{(III)}$$

wherein
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, X, X'=linear and/or branched alkylene or cycloalkylene radicals having 1 to 20 carbon atoms, R''=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl,
n=0 to 2,
m=0 to 2,
m+n=2, and
x, y=0 to 2,
and
between 2.5 and 97.5 mol %, based on the entirety of structural units (III) and (IV), of at least one structural unit of the formula (IV)

$$\text{—Z—(X—SiR''}_x\text{(OR')}_{3-x}\text{)} \quad \text{(IV)},$$

wherein
Z=—NH—, —NR—, —O—, with
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
x=0 to 2, and
X, R', R'' have the definition stated in the case of formula (III).

3. A multistage coating method which comprises applying a pigmented basecoat film to an optionally precoated substrate and thereafter applying a film of the coating composition of claim 1.

4. A method of making an automotive OEM finish or automotive refinish, comprising applying the coating composition of claim 1 as a clearcoat material to a substrate.

5. A multicoat effect and/or color paint system comprising at least one pigmented basecoat and at least one clearcoat disposed thereon, wherein the clearcoat has been produced from the coating composition of claim 1.

6. The coating composition of claim 1, further comprising a solvent or solvent mixture including butyl acetate.

* * * * *